May 30, 1950          A. M. SALAZAR          2,509,252
BATTERY CHARGING SYSTEM
Filed July 30, 1945
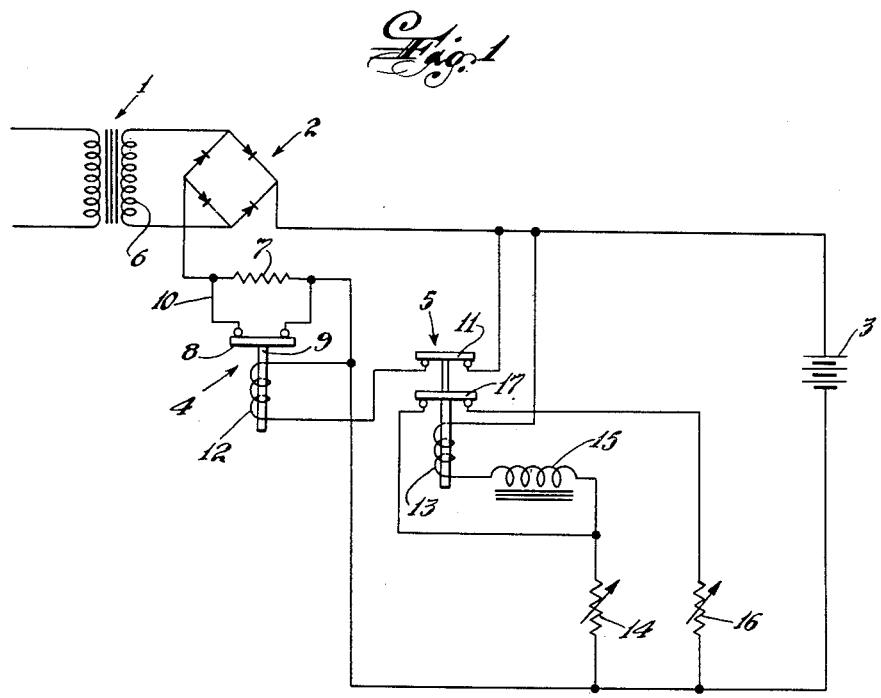
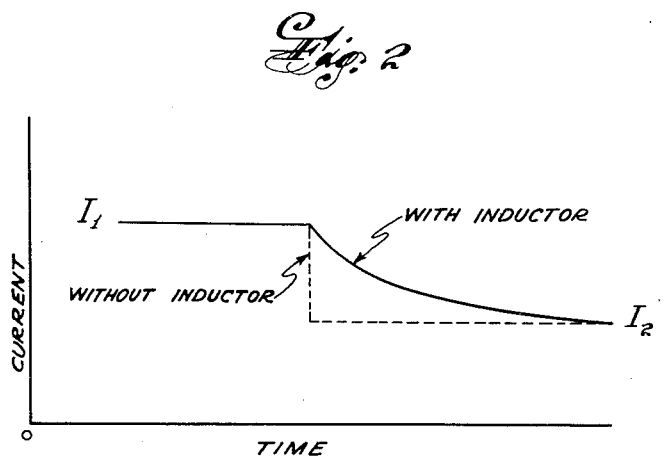
INVENTOR.
Alfred M. Salazar
BY C. Cornell Remsen J
ATTORNEY Patented May 30, 1950

2,509,252

UNITED STATES PATENT OFFICE 2,509,252

BATTERY CHARGING SYSTEM

Alfred M. Salazar, West Islip, N. Y., assignor to Federal Telephone and Radio Corporation, New York, N. Y., a corporation of Delaware Application July 30, 1945, Serial No. 607,819

6 Claims. (Cl. 320—23)

This invention relates to energizing circuits for voltage-responsive relays and is more particularly concerned with a storage battery charging system embodying a regulating circuit which includes a voltage-responsive relay.

An object of the invention is to provide an improved voltage-responsive relay energizing circuit, of the type in which the value of the resistance in the circuit is suddenly changed upon operation of the relay, which will assure operation of the relay without chattering.

Another object is to provide a simple, dependable storage battery charging system in which the battery charging rate is regulated by a voltage-responsive relay connected across the terminals of the storage battery.

In accordance with the invention a voltage-responsive relay energizing circuit which includes a resistance arranged to have its value suddenly changed upon operation of the relay is provided with means for preventing a sudden change in the value of the current in the relay operating winding, consequent upon the change in the resistance of the circuit, to prevent chattering of the relay upon operation.

The invention will be more fully understood from the following specification and the annexed drawings in which:

Fig. 1 is a circuit diagram of a storage battery charging system embodying the invention; and Fig. 2 illustrates diagrammatically the current-time relationship in the relay winding when it is operated.

A storage battery charging system embodying the present invention may have the form illustrated in Fig. 1, including an alternating current supply 1, a rectifier 2 adapted to convert current from the supply to direct current for charging the storage battery 3. Means for varying the resistance of the battery charging circuit, including a relay for operating the same, is illustrated at 4, and a relay 5 responsive to the voltage across the battery terminals is provided for regulating the operation of the relay 4 in accordance with the voltage across the battery terminals.

The current supply may conveniently take the form of a transformer 1, connected to a source of alternating current, whose secondary winding 6 supplies alternating current at an appropriate voltage to a rectifier set connected in the well-known Wheatstone bridge arrangement as indicated at 2. The battery 3 is connected with the output of the rectifier by a circuit which includes a series resistance 7. The resistance 7 is arranged to be short circuited by a shunt circuit 10 during the earlier part of the charging operation by a normally closed set of contacts 8 of the relay 9 to permit the application to the battery of full charging current at the beginning of the charging operation. Operation of the relay 9 to open the shunt circuit 10 across the terminals of resistance 7 is under the control of the voltage responsive relay 5, the energizing circuit of which is connected across the terminals of the battery as shown.

The relay 5 includes a set of contacts 11 which in their normally closed position serve to connect the operating winding 12 of relay 9 across the direct current source 2 and serve when opened, upon operation of relay 5, to cause the auxiliary relay 9 to operate to increase the resistance in series with the battery.

The energizing circuit of relay 5 includes the relay operating winding 13, a variable resistance 14 and a reactor 15 in series with the operating winding 13. A second adjustable resistance element 16 is connected in shunt with the variable resistance 14 by a second set of normally closed contacts 17 of relay 5.

As the charge in the storage battery 3 increases the terminal voltage of the battery increases as is well known. The relay 5 is adapted to respond when the voltage of the storage battery has risen to a selected value which is determined by the setting of the variable resistance element 16. When the relay 5 operates, both sets of contacts 11 and 17 are opened. Opening of contacts 11 deenergizes the operating winding 12 of relay 9, thus causing relay 9 to operate to open the shunt circuit 10. When shunt circuit 10 has been opened, the charging current must flow through resistance 7, and the resistance in the charging circuit is thus increased. Opening of contacts 17 disconnects the shunt variable resistance 16 from the energizing circuit of relay 5, thus suddenly changing the value of the resistance of this circuit.

The operation of the storage battery charging system described is as follows:

Current from the supply transformer 1 is converted to direct current at 2 and applied across the terminals of the storage battery 3 in a direction to charge the battery. At the beginning of the charging operation, the current supplied to the battery may be relatively high without causing gassing of the battery. For this reason, the current limiting resistance 7 is at the beginning of the charging operation, in effect, removed from the circuit by the low resistance circuit 10 shunted across the terminals of the resistance. The shunt circuit 10 is at this time closed by the normally closed contacts 8 of the auxiliary relay 9.

As charging of the storage battery 3 continues, the voltage of the battery 3 gradually rises until it reaches a selected value which will cause the relay 5 to operate. Operation of the relay 5 can be caused to occur at the desired state of charge of the battery, as measured by the voltage across its terminals, by adjustment of the variable resistance 16 in the energizing circuit for relay 5.

Upon operation of relay 5, contacts 11 are opened to deenergize the operating winding of the auxiliary relay 9 and cause this relay to operate. When relay 9 is operated, contacts 8 are moved to open the shunt circuit 10. The resistance 7 is now connected in series with the terminals of battery 3 to decrease the current flowing through the battery.

Operation of relay 5 also causes contacts 17 to be operated to open the circuit of the shunt variable resistance 16. Removal of the shunt resistance 16 from the energizing circuit of relay 5 would cause a very quick decay of the current in operating winding 13 were it not for the inductance provided by reactor 15 in series with this winding. As illustrated in Fig. 2, the current value $I_1$ in the winding 13 drops off almost immediately to its final value, $I_2$, which is determined primarily by the value of resistance 14, upon operation of the relay when no inductor is provided. When inductor 15 is provided in series with the winding 13 it will be observed in Fig. 2 that upon operation of the relay the current value $I_1$ decays slowly to value $I_2$. It has been found that a slow decay of current in the operating winding 13 will permit the relay to maintain its new position upon operation and prevent its responding again with consequent chattering.

Although the voltage responsive relay energizing circuit including a resistance adapted to be suddenly removed from the circuit upon operation of the relay and a series connected inductor has been described in connection with a battery charging system in which it has particular advantages, it will be appreciated that this energizing circuit will find utility in other applications. The description of the invention herein with particular reference to the particular embodiment shown is by way of illustration rather than limitation.

I claim:

1. A voltage-responsive relay energizing system including, in combination, a voltage source, a relay having a set of normally closed contacts and an operating winding connected across said voltage source to operate said relay upon change in voltage, a resistance connected across said voltage source in series with said winding, a second resistance connected in shunt with said resistance by said normally closed contacts and adapted to be disconnected from said resistance upon operation of the relay, and a reactor connected in series with said winding for retarding the decay of current in said winding upon disconnection of said second resistance to prevent chattering of the relay.

2. A storage battery charging system including, in combination, a source of direct current, a storage battery to be charged, a first circuit including in series said source of direct current, said storage battery, and means for varying the resistance of said circuit, a relay for actuating said resistance varying means including a set of normally closed contacts, an energizing circuit for said relay responsive to the voltage across the battery terminals and including an operating winding for said relay and a reactor in series therewith, a resistance element connected in said energizing circuit in series with said winding by said normally closed contacts and adapted to be disconnected from said circuit upon operation of said relay, said relay energizing circuit being responsive to a rise in voltage across said battery terminals above a predetermined value to operate said relay without chattering to actuate said resistance varying means and to disconnect said resistance element.

3. A storage battery charging system including, in combination, a source of direct current, a first circuit including in series said source of current, the storage battery to be charged and a resistance element, a first relay having normally closed contacts connected to short circuit said resistance element and adapted upon operation of the relay to open said short circuit, a second relay for operating said first relay having two sets of normally closed contacts, an operating winding for the first relay connected across said source by one of said sets of normally closed contacts and adapted to be deenergized to operate said first relay upon operation of said second relay, a circuit for energizing said second relay responsive to the voltage across said battery terminals and including in series a reactor and a variable resistance, a second variable resistance connected in shunt with said first variable resistance by the other set of said normally closed sets of contacts, said second relay being adapted to operate without chattering to open both sets of contacts when the voltage across said battery terminals exceeds a selected value determined by the setting of said second variable resistance, and thereby operate said first relay to increase the resistance in said first circuit and to open the circuit including said second variable resistance.

4. A voltage-responsive relay energizing system, including in combination, a voltage source, a relay, a circuit connected across said voltage source, said circuit comprising a winding adapted to operate said relay upon a change in voltage, a reactor connected in series with said winding, a first resistor connected in series with said reactor and a second resistor connected in shunt with said first resistor, said relay being operable to disconnect said second resistor thereby increasing the resistance of said circuit, and said reactor operating to retard the change in value of the current through said circuit upon said resistance being increased to prevent chattering of said relay.

5. A voltage-responsive relay energizing system including, in combination, a voltage source, a relay having normally closed contacts, a circuit connected across said voltage source, said circuit comprising a winding adapted to operate said relay upon a change in voltage, a reactor connected in series with said winding, a first resistor connected in series with said reactor, a second resistor connected in shunt to said first resistor through the closed contacts of said relay, said relay being operable to disconnect said second resistor thereby suddenly increasing the resistance of said circuit, and said reactor operating to retard the sudden decay of current in said winding upon disconnection of said second resistor to prevent chattering of the relay.

6. A storage battery charging system including, in combination, a source of direct current, a storage battery to be charged, a first circuit including in series said source of direct current, said storage battery and means for varying the resistance of said circuit, a relay for actuating said resistance varying means, an energizing circuit for said relay responsive to the voltage across the battery terminals and including in series an operating coil for said relay and a reactor, a resistance element connected in said energizing circuit, means for suddenly varying the resistance of said resistance element upon operation of said relay, said relay energizing circuit being adapted upon rise of the voltage across said battery terminals above a predetermined value to cause said relay to operate without chattering notwithstanding the sudden change in the resistance of the resistance element.

ALFRED M. SALAZAR.

REFERENCES CITED

The following references are of record in the file of this patent:

UNITED STATES PATENTS

| Number | Name | Date |
|---|---|---|
| 1,199,936 | Simon | Oct. 3, 1916 |
| 1,306,315 | Sinclair | June 10, 1919 |
| 1,474,694 | Tobien | Nov. 20, 1923 |
| 1,587,061 | Anderson | June 1, 1926 |
| 1,641,285 | Miller | Sept. 6, 1927 |
| 1,662,060 | Herman | Mar. 13, 1928 |
| 1,669,516 | Golladay | May 15, 1928 |
| 1,794,400 | Forster | Mar. 3, 1931 |
| 1,825,221 | Crago | Sept. 29, 1931 |
| 2,096,440 | Wetzer | Oct. 19, 1937 |
| 2,104,141 | Wagar | Dec. 14, 1937 |
| 2,104,602 | Agnew et al. | Jan. 4, 1938 |
| 2,216,598 | Minneci | Oct. 1, 1940 |
| 2,272,745 | Hinds et al. | Feb. 10, 1942 |
| 2,309,066 | Harder | Jan. 19, 1943 |
| 2,311,574 | Richards | Feb. 16, 1943 |
| 2,339,581 | Paulson et al. | Jan. 18, 1944 |
| 2,366,466 | Amsden | Jan. 2, 1945 |
| 2,377,596 | Williams | June 5, 1945 |